United States Patent [19]

Morena et al.

[11] Patent Number: 5,064,461
[45] Date of Patent: Nov. 12, 1991

[54] BLUE/GRAY TRANSPARENT GLASS-CERAMIC ARTICLES

[75] Inventors: Robert M. Morena, Caton; Linda R. Pinckney, Corning, both of N.Y.

[73] Assignee: Corning Incorporated, Corning, N.Y.

[21] Appl. No.: 604,184

[22] Filed: Oct. 29, 1990

[51] Int. Cl.$^5$ ............... C03C 10/00; C03C 10/14; C03C 10/16
[52] U.S. Cl. .......................... 65/33; 501/3; 501/4
[58] Field of Search ............... 501/3, 4; 65/33

[56] References Cited

U.S. PATENT DOCUMENTS

| | | | |
|---|---|---|---|
| 3,642,504 | 2/1972 | Petzold et al. | 501/4 |
| 4,009,042 | 2/1977 | Rittler | 501/4 |
| 4,018,612 | 4/1977 | Chyung | 501/4 |
| 4,084,974 | 4/1978 | Beall et al. | 501/4 |
| 4,192,688 | 3/1980 | Babcock et al. | 501/7 |

*Primary Examiner*—Mark L. Bell
*Attorney, Agent, or Firm*—C. S. Janes, Jr.

[57] ABSTRACT

This invention is directed to the production of transparent glass-ceramic articles demonstrating linear coefficients of thermal expansion of less than $10 \times 10^{-7}/°C$. and exhibiting a blue or gray coloration. The articles are prepared by heat treating reducing precursor glass articles consisting essentially, in weight percent as calculated from the batch, of 2.5–3.5% $Li_2O$, 1.5–2.5% MgO, 17.75–20% $Al_2O_3$, 64–70% $SiO_2$, 2–4.5% $TiO_2$, 1–2% $ZrO_2$, 0–2% BaO, and 0.2–0.5% Cl, wherein alkali metals other than $Li_2O$, alkaline earth oxides other than MgO and BaO, ZnO, and $B_2O_3$ are essentially absent therefrom.

5 Claims, No Drawings

BLUE/GRAY TRANSPARENT GLASS-CERAMIC ARTICLES

RELATED APPLICATION

U.S. Application Ser. No. 604,177, filed concurrently herewith by Bruce G. Aitken under the title BLUE TRANSPARENT GLASS-CERAMIC ARTICLES, discloses the preparation of transparent, silicophosphate-based glass-ceramic articles exhibiting a blue coloration resulting from the presence of $Ti^{+3}$ ions therein through the use of $Ti_2O_3$ as a batch material and/or the reduction of $Ti^{+4}$ ions to $Ti^{+3}$ ions through the use of a hydrogen-containing phosphate as a batch source of $P_2O_5$ and/or through the inclusion of chloride as a fining agent and to reduce $Ti^{+4}$ ions to $Ti^{+3}$ ions.

BACKGROUND OF THE INVENTION

The production of glass-ceramic articles was first detailed in U.S. Pat. No. 2,920,971 (Stookey). That patent defines the preparation thereof as comprising three fundamental steps. First, a glass forming batch commonly containing a nucleating agent is melted. Second, that melt is cooled to a temperature below the transformation range thereof and, simultaneously with said cooling, a glass article of a desired configuration is shaped therefrom. (As employed herein, the transformation range is characterized as that temperature at which a molten mass becomes an amorphous solid, that temperature being deemed to reside in the vicinity of the annealing point of the glass. Third, that glass article is subjected to a heat treatment schedule to crystallize the glass in situ. Customarily, the heat treatment schedule consists of two steps: (1) the glass article is initially heated to a temperature somewhat above the transformation range for a sufficient length of time to generate nuclei therein; and thereafter (2) the temperature is raised to above the annealing point and frequently above the softening point of the glass for a sufficient length of time to cause the growth of crystals on the nuclei.

Glass-ceramic articles are typically highly crystalline, the crystals being fine-grained, substantially uniform in size, and homogeneously dispersed throughout the minor amount of residual glassy phase. Because the crystals are developed in situ in a precursor glass body, glass-ceramic articles are free of voids and non-porous.

Whereas U.S. Pat. No. 2,920,971 describes the formation of opaque glass-ceramic articles, further research led to the preparation of transparent articles. One transparent glass-ceramic being currently marketed commercially by Corning Incorporated, Corning, New York is cookware under the trademark VISIONS. That cookware lies within the scope of U.S. Pat. No. 4,018,612 (Chyung), which patent defines compositions within a narrow range of the $Li_2O$-$MgO$-$ZnO$-$Al_2O_3$-$SiO_2$ system nucleated with a combination of $TiO_2$ and $ZrO_2$ to produce highly crystalline articles containing $\beta$-quartz solid solution as the predominant crystal phase.

Recent marketing studies have indicted a widespread customer interest in cookware fashioned from a transparent glass-ceramic body exhibiting a soft blue or light gray tint. U.S. Pat. No. 4,018,612 discusses the optional incorporation of glass colorants in the parent glass composition, explicitly referring to chromium, cobalt, copper, iron, manganese, nickel, and vanadium. U.S. Pat. No. 4,192,688 (Babcock et al.) also describes the inclusion of glass colorants in the precursor glass compositions for glass-ceramic articles. The latter patent, however, observes that the colors developed in a glass-ceramic body are frequently quite different from those conventionally generated in glass bodies. Moreover, the color of a transparent glass-ceramic using the same coloring agent will frequently be different from that observed in an opaque glass-ceramic article having the same base composition. As an illustration of those phenomena, cobalt has long been recognized as conferring a blue color to glasses, but in a transparent glass-ceramic article the color becomes lavender, and in an opaque glass-ceramic of the same composition the color displayed is a very pale blue. In another example, a combination of cobalt and nickel imparts an amber color to the parent glass article, but yields a cranberry red hue in the transparent glass-ceramic article produced therefrom and a blue shade in the opaque glass-ceramic article derived therefrom.

U.S. Pat. No. 4,084,974 (Beall et al.) discloses the production of colored transparent glass-ceramic articles containing $\beta$-quartz solid solution as the predominant crystal phase from parent glasses having base compositions within the lithium aluminosilicate system nucleated with $TiO_2$. In that patent, a carbonaceous reducing agent (expressly noting carbon, starch, and sucrose) is added to the glass forming batch so that, during melting, some of the $Ti^{+4}$ ions will be reduced to $Ti^{+3}$ ions. Thereafter, when the glass body is crystallized in situ, the resulting transparent glass-ceramic will display a blue-to-black color, depending upon the extent of titanium reduction.

Although the operability of that procedure could be shown repeatedly on a small laboratory scale, it proved difficult to control in large scale commercial production. That is, problems in fining of the glass melt and variations in physical properties such as the coefficient of thermal expansion were experienced.

Accordingly, the principal objective of the present invention was to prepare transparent glass-ceramic articles containing $\beta$-quartz solid solution as the predominant crystal phase, exhibiting a linear coefficient of thermal expansion (25°-600° C.) less than $10 \times 10^{-7}/°$ C., preferably less than $6 \times 10^{-7}/°$ C., and demonstrating a light blue or gray color without the use of a carbonaceous reducing agent.

SUMMARY OF THE INVENTION

That objective can be achieved in glass-ceramic articles generally within the base composition intervals of U.S. Pat. No. 4,018,612, but wherein ZnO will be omitted. Thus, the base precursor glass compositions consist essentially, expressed in weight percent on the oxide basis, of

| | | | |
|---|---|---|---|
| $Li_2O$ | 2.5–3.5 | $SiO_2$ | 64–70 |
| MgO | 1.5–2.5 | $TiO_2$ | 2–4.5 |
| $Al_2O_3$ | 17.75–20 | $ZrO_2$ | 1–2 |
| BaO | 0–2 | | | wherein alkali metal oxides other than $Li_2O$, alkaline earth metal oxides other than BaO, and $B_2O_3$ are essentially absent therefrom.

The glasses are prepared under reducing conditions through chloride fining such that some of the $Ti^{+4}$ ions will be reduced to $Ti^{+3}$ ions. The reduced glasses show a grayish coloration in contrast to the light amber tint customarily seen in the unreduced, $TiO_2$-containing glass. When subjected to a heat treatment schedule to effect in situ crystallization of the glass, the resulting glass-ceramic articles display a light blue or gray color, depending upon the extent of titanium reduction. That coloration has been postulated to be due to the absorption by $Ti^{+3}$ ions in the visible portion of the radiation spectrum. The presence of $Ti^{+3}$ ions has been confirmed through EPR (electron paramagnetic resonance) spectroscopy; which analysis has indicated that between about 0.5–2% of the total titanium is present as $Ti^{+3}$ ions.

Two problems have been associated with chloride-fining of glass compositions within the ranges set forth in U.S. Pat. No. 4,018,612. The first involves the small amount of chloride, typically about 0.2–0.5% by weight, retained within the glass-ceramic body, presumably within the residual glassy matrix. X-ray diffraction analyses have indicated that the presence of chloride produces an increase in the amount of residual glassy phase. The effect becomes quite pronounced at chloride levels greater than 3.5%. The most immediate effect resulting from the greater concentration of glassy phase is a rise in the linear coefficient of thermal expansion from about $5 \times 10^{-7}/°$ C. (25°–600° C.), for a chloride-free product, to about $7.5 \times 10^{-7}/°$ C. at 3% batched chloride, to about $15 \times 10^{-7}/°$ C. at 6% batched chloride. The problem associated with chloride fining has been the volatilization of zinc during melting, presumably as $ZnCl_2$. Thus, where ZnO is batched at a 1% level, the ZnO retained in the glass drops to about 0.3% where chloride is batched at 2%. It has been conjectured that this loss of ZnO contributes to the higher coefficient of thermal expansion, inasmuch as $Zn^{+2}$ is a stuffing cation for the $\beta$-quartz structure. It will be recognized that other cations in small amounts may be included to adjust the thermal expansion of the inventive products.

Laboratory experience demonstrated that blue or gray colors cannot be secured in the glasses where the batched chloride level was below 6% by weight. Yet, as was explained above, such concentrations of chloride yielded an increased amount of residual glassy matrix with a concomitant sharp rise in the linear coefficient of thermal expansion demonstrated by the resultant glass-ceramic body. Attempts to obtain blue or gray colors with batched chloride concentrations below 6% by weight were unsuccessful; EPR measurements indicated that the content of $Ti^{+3}$ ions was too low to provide the desired blue or gray hues. Thus, the dominant tint generated in the glass-ceramic bodies resulting from batched chloride levels below 6% by weight was a pale yellow, which color was posited to be associated with a defect center attributable to the presence of chloride.

The instant invention is founded upon a technique to increase the amount of retained chloride in the final glass-ceramic body without having to use excessive amounts of batched chloride. Stated in another way, the inventive method sought to obtain the same level of retained chloride, viz., about 0.2–0.5%, preferably no more than 0.4%, but using a lower concentration of batched chloride. That goal was achieved through the deletion of ZnO from the base glass composition. It is believed that this deletion eliminates chlorine volatilization via $ZnCl_2$. Furthermore, to assure that a sufficient quantity of $Ti^{+3}$ ions will be produced via reduction, the preferred minimum level of $TiO_2$ in the precursor glass composition will be at least 2.25% by weight, and the most preferred will be at least 2.5%. Those modifications in base glass composition have permitted the development of desired blue and gray tints at batched levels of chloride of at least 2% and below 6% and, preferably, of about 2.5–5% by weight.

The process for manufacturing the inventive glass-ceramic articles consists essentially of three basic steps:

(a) a glass batch consisting essentially, expressed in terms of weight percent on the oxide basis as calculated from the batch, of 2.5–3.5% $Li_2O$, 1.5–2.5% MgO, 17.75–20% $Al_2O_3$, 64–70% $SiO_2$, 2–4.5% $TiO_2$, 1–2% $ZrO_2$, 0–2% BaO, and chloride in an amount at least sufficient to reduce about 0.5–2% of the total titanium content to $Ti^{+3}$ ions, wherein alkali metal oxides other than $Li_2O$, alkaline earth oxides other than MgO and BaO, and $B_2O_3$ are essentially absent therefrom is melted;

(b) said melt is cooled to a temperature below the transformation range thereof and, simultaneously with said cooling, a glass body of a desired configuration is shaped therefrom; and (c) said glass body is heated to a temperature between about 850°–950° C. for a period of time sufficient to develop crystallization in situ of $\beta$-quartz solid solution crystals as the predominant crystal phase.

Typically, in order to prepare a glass-ceramic body of high crystallinity in which the crystals are very uniformly fine-grained, the precursor glass articles will be heated initially to a temperature somewhat above the transformation range, e.g., about 750°–800° C., for a period of time sufficient to generate a myriad of nuclei in the glass, after which the glass is heated to the crystallization range of temperature. The inventive glasses crystallize very rapidly; i.e., an exposure of the parent glass to a nucleation treatment of no more than 0.5 hour and to a crystallization period of no more than 0.5 hour will commonly be sufficient to yield a highly crystalline, very fine-grained article.

DESCRIPTION OF PREFERRED EMBODIMENTS

Table I reports a group of parent glass compositions, expressed in terms of parts by weight on the oxide basis (except for chloride) as calculated from the batch materials. Inasmuch as the sum of the individual constituents totals or very closely totals 100, for all practical purposes the values recorded in Table I can be considered to reflect weight percent. It will be recognized that the actual batch ingredients can comprise any materials, either oxides or other compounds, which, when melted together, will be converted into the desired oxide in the proper proportions. For example, $Li_2CO_3$ and $MgCO_3$ can comprise the sources of $Li_2O$ and MgO, respectively. LiCl and $BaCl_2$ were employed as the sources of chloride, but MgCl or $NH_4Cl$ could likewise be used.

The batch materials were compounded, ballmilled together to assist in securing a homogeneous melt, and charged into silica or platinum crucibles. The crucibles were introduced into a furnace operating at about 1650° C. and the batches melted for about 16 hours. The melts were poured into steel molds to form rectangular glass slabs having dimensions of about $8'' \times 5'' \times 0.5''$, which slabs were transferred immediately to an annealer operating at about 650° C. Samples of the necessary size and geometry for various testing procedures were cut from the annealed slabs.

TABLE I

|  | 1 | 2 | 3 |
| --- | --- | --- | --- |
| $Li_2O$ | 2.77 | 2.79 | 2.76 |
| MgO | 1.78 | 1.79 | 1.78 |
| BaO | 0.74 | 0.75 | 0.75 |
| $Al_2O_3$ | 19.3 | 19.2 | 19.0 |
| $SiO_2$ | 68.2 | 68.0 | 67.3 |
| $ZrO_2$ | 1.78 | 1.79 | 1.78 |
| $TiO_2$ | 2.58 | 2.59 | 3.06 |
| Cl | 2.72 | 2.99 | 3.45 |

Whereas the above description represents work conducted in the laboratory, it will be appreciated that the recited glass batches can be melted and glass bodies formed therefrom utilizing large scale glassmaking practices. The glasses appeared to be well fined with the chloride levels used. The glass slabs described in the above examples were annealed to room temperature to allow visual inspection of glass quality and to cut samples for physical property measurements. It is much easier to cut the slabs as glasses rather than after they have been crystallized in situ. Nevertheless, cooling of the parent glass body to room temperature prior to exposing it to the crystallization heat treatment is not required. Instead, it is only necessary that the melts be cooled below the transformation range of the glass to provide a virtually crystal-free glass body, and thereafter the crystallization heat treatment initiated.

Table II lists the nucleation and crystallization heat treatment schedule applied to each of the glass slabs and the test samples cut therefrom. Although individual dwell periods at specific temperatures are frequently employed as a matter of convenience, that practice is not required. It is only necessary that the precursor glass body be exposed to temperatures within the nucleation and crystallization intervals for a sufficient length of time to secure the desired substantial nucleation and high crystallinity. In the schedule recorded in Table II, the glass bodies were heated in an electrically-fired furnace at a rate of about 700° C./hour to the hold period, and then cooled to room temperature at a rate of about 500° C./hour.

Table II also reports a visual description of each crystallized example (Ex.) and the linear coefficient of thermal expansion (Exp.), as measured over the temperature range of 25°–500° C. and expressed in terms of $\times 10^{-7}/°$ C.

Electron microscopy and X-ray diffraction analyses have indicated the final articles to be highly crystalline, typically greater than 75% by volume. The individual crystals are commonly smaller than 300 nm in diameter so as to assure transparency in the product. X-ray diffraction analyses have also identified β-quartz solid solution as essentially the sole crystal phase present.

TABLE II

| Ex. | Heat Treatment | Description | Exp. |
| --- | --- | --- | --- |
| 1 | Hold 0.3 hour at 790° C.<br>Hold 0.3 hour at 890° C. | Light Gray | 9.6 |
| 2 | Hold 0.3 hour at 790° C.<br>Hold 0.3 hour at 890° C. | Light Blue | — |
| 3 | Hold 0.3 hour at 790° C.<br>Hold 0.3 hour at 890° C. | Medium Blue | — |

The preferred composition intervals consist essentially of 2.5–3% $Li_2O$, 1.5–2% MgO, 18.5–19.5% $Al_2O_3$, 67–69% $SiO_2$, 2.5–3.5% $TiO_2$, 1.5–2% $ZrO_2$, 0.5–1.5% BaO, and 0.2–0.4% Cl. Example 2 is considered to be the most preferred composition from an aesthetic point of view. As can be observed from Example 3, the combination of higher $TiO_2$ and Cl levels leads to a darker blue color.

We claim:

1. A method for making a blue or gray transparent glass-ceramic article exhibiting a linear coefficient of thermal expansion (25°–500° C.) less than about $10 \times 10^{-7}/°$ C. and containing β-quartz solid solution as essentially the sole crystal phase present consisting essentially of the steps:

(a) melting a glass batch which is crystallizable in situ consisting essentially, expressed in terms of weight percent on the oxide basis, of 2.5–3.5% $LiO_2$, 1.5–2.5% MgO, 17.75–20% $Al_2O_3$, 64–70% $SiO_2$, 2–4.5% $TiO_2$, 1–2% $ZrO_2$, and 0–2% BaO, and chloride in an amount at least sufficient to reduce about 0.5–2% of the total titanium content to $Ti^{+3}$ ions, wherein alkali metal oxides other than $LiO_2$, alkaline earth oxides other than MgO and CaO, ZnO, and $B_2O_3$ are essentially absent therefrom;

(b) cooling said melt to a temperature below the transformation range thereof and simultaneously forming a glass body therefrom; and then (c) heating said glass body to a temperature between about 850°–950° C. for a period of time sufficient to cause the crystallization in situ of β-quartz solid solution crystals.

2. A method according to claim 1 wherein said chloride is present in an amount of 2–6% by weight.

3. A method according to claim 2 wherein said chloride is present in an amount of about 2.5–5% by weight.

4. A method according to claim 3 wherein said glass batch consists essentially of 2.5–3% $LiO_2$, 1.5–2% MgO, 18.5–19.5% $Al_2O_3$, 67–69% $SiO_2$, 2.5–3.5% $TiO_2$, 1.5–2% $ZrO_2$, 0.5–1.5% BaO, and 2.5–5% Cl.

5. A method according to claim 1 wherein said glass body is first heated to a temperature between about 750°–800° C. for a period of time sufficient to cause the development of nuclei therein, after which the glass body is heated to a temperature between about 850°–950° C. for a period of time sufficient to cause the growth of β-quartz solid solution crystals on those nuclei.

* * * * *

UNITED STATES PATENT AND TRADEMARK OFFICE
CERTIFICATE OF CORRECTION

PATENT NO. : 5,064,461

DATED : November 12, 1991

INVENTOR(S) : Robert M. Morena, et al

It is certified that error appears in the above-identified patent and that said Letters Patent is hereby corrected as shown below:

Column 1, line 31, after "of the glass." add --)--.

Column 4, line 54, "$LiO_2O$" should read --$Li_2O$--.

Column 6, line 27, "$LiO_2$" should read --$Li_2O$--.

Column 6, line 32, "$LiO_2$" should read --$Li_2O$--.

Column 6, line 47, "$LiO_2$" should read --$Li_2O$--.

Signed and Sealed this

Sixteenth Day of March, 1993

*Attest:*

STEPHEN G. KUNIN

*Attesting Officer*  *Acting Commissioner of Patents and Trademarks*

UNITED STATES PATENT AND TRADEMARK OFFICE
CERTIFICATE OF CORRECTION

PATENT NO. : 5,064,461
DATED : November 12, 1991
INVENTOR(S) : Robert M. Morena, et. al.

It is certified that error appears in the above-indentified patent and that said Letters Patent is hereby corrected as shown below:

Column 6, line 33, "CaO" should read --BaO--.

Signed and Sealed this

First Day of February, 1994

*Attest:*

BRUCE LEHMAN

*Attesting Officer*  Commissioner of Patents and Trademarks